Dec. 28, 1965  F. B. EWING, JR  3,225,729
HIGH SPEED SEA GOING PLANING HULL

Filed Dec. 11, 1963  2 Sheets-Sheet 1

INVENTOR.
FRED B. EWING, JR.
BY
Barlow & Barlow
ATTORNEYS

Dec. 28, 1965   F. B. EWING, JR   3,225,729
HIGH SPEED SEA GOING PLANING HULL
Filed Dec. 11, 1963   2 Sheets-Sheet 2

INVENTOR.
FRED B. EWING, JR.
BY
Barlow & Barlow
ATTORNEYS

United States Patent Office 3,225,729
Patented Dec. 28, 1965

3,225,729
HIGH SPEED SEA GOING PLANING HULL
Fred B. Ewing, Jr., 677 Neck Road, Tiverton, R.I.
Filed Dec. 11, 1963, Ser. No. 329,759
5 Claims. (Cl. 114—66.5)

This invention relates to a hull for a high speed vessel using a multiple point suspension when planing, or in the planing range or close thereto.

One of the objects of this invention is to provide a single hull which will maintain high speeds at or near planing velocities even in high seas.

Another object of this invention is to provide a single hull which will cut through high seas while in the planing range without inducing exorbitant slamming stresses on the hull or its equipment and without appreciable loss of speed.

Another object of this invention is to provide a hull for a high speed vessel having forward and after sections with a forward section so constructed that it will provide a flattened wake on which the after section rides to materially reduce the pounding normally encountered in other known planing type hulls.

A more specific object of the invention is to provide an inverted V-type hull with an arrangement so that it will not pound in a seaway.

Another object of the invention is to cushion any pounding of the hull which might tend to occur.

With these and other objects in view, the invention consists of certain novel features of construction as will be more fully described and particularly pointed out in the appended claims.

Figure 1:
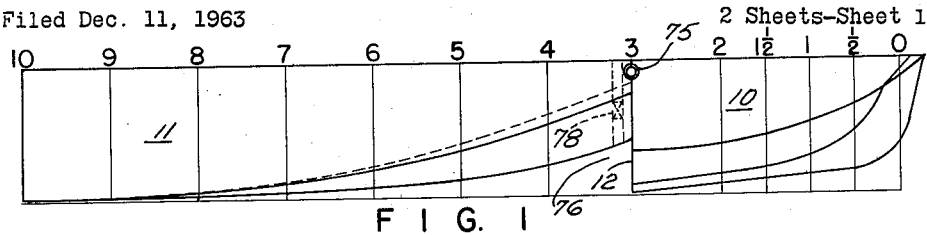
Figure 2:
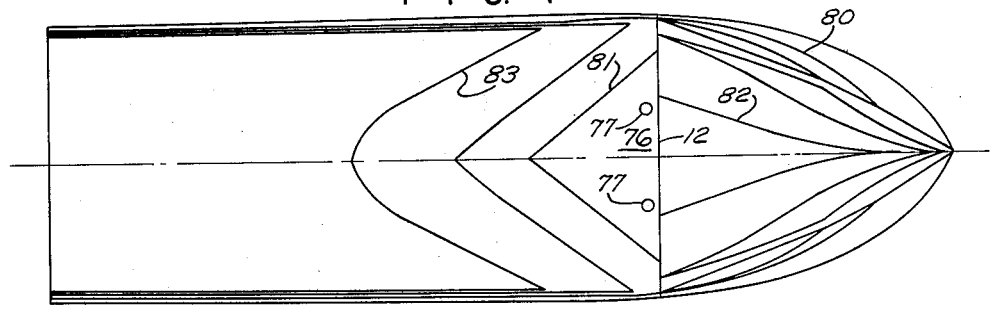
Figure 3:
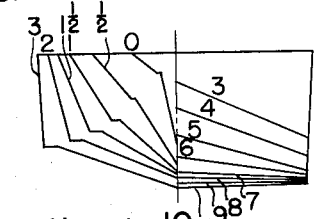
Figure 4:
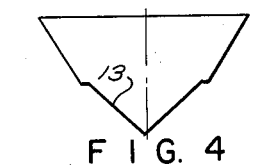
Figure 5:
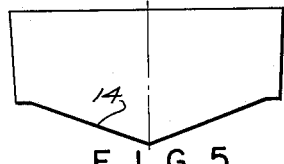
Figure 6:
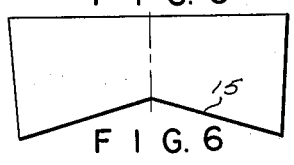
Figure 7:
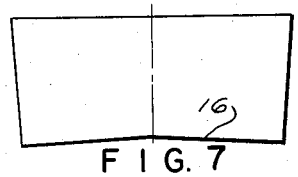
Figure 8:
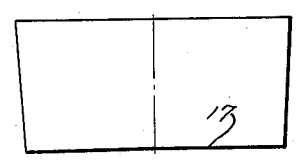
Figure 9:
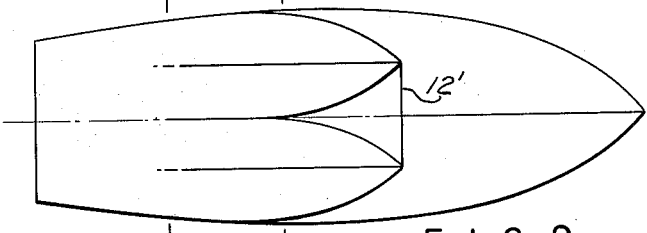
Figure 10:
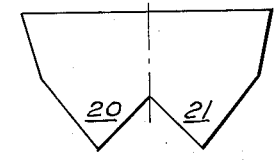
Figure 11:
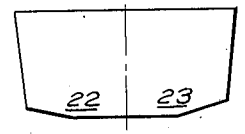

In the accompanying drawings:

FIG. 1 is a profile of the vessel hull;
FIG. 2 is a bottom plan view;
FIG. 3 is a diagrammatic view of the body showing the lines thereon for lateral sections at different stations;
FIGS. 4 to 8 are diagrammatic line sections at various locations along the length of the vessel;
FIG. 9 is a bottom plan view of the same type as FIG. 2 but showing a modified construction;
FIG. 10 is a section on line 10—10 of FIG. 9;
FIG. 11 is a section on line 11—11 of FIG. 9; and
FIGS. 12 through 30 are diagrammatic line sections of various modifications which may be used in connection with this invention.

In proceeding with this invention, I provide a single hull having a forward section and an after section with the forward section being so arranged that it will provide a relatively flattened wake into which the after section may enter. Such a flattened wake smooths out the sea and eliminates the exorbitant slamming stresses on the hull which otherwise would occur, thus materially reducing the pounding normally encountered in planing hulls.

With reference to the drawings, the forward section is designated generally 10 and the after section generally 11. The shape of the hull may be seen from FIGS. 1, 2 and 3 where in usual practice the vertical lines numbered 1–10 indicate various stations, the lateral sections being indicated in FIG. 3 by the lines numbered to correspond to the station lines on the profile view of FIG. 1. The forward section consisting of stations 0 to 3 terminates in a flat transom 12 which extends laterally of the vessel as seen in the bottom plan view in FIG. 2. The entry is the type found principally with a displacement hull and comprises a sharp V-section 13 as seen best in full section at FIG. 4 (station 1), gradually broadening out into a shallow type V as seen at 14 in FIG. 5 (station 3) with the lateral flat transom 12 flattening out the surface of the water. This lateral flat transom 12 flattens out the sea and provides a flattened wake at this location while also serving as a planing portion to elevate the forward section of the hull.

The shape of the after section as may be seen from FIGS. 1, 2 and 3 comprises an inverted V as at 15 (station 5) possessing a sharp angle at the forward portion that gradually becomes a flatter angle as seen progressively at 16 (station 7) and 17 (station 9) (FIGS. 7 and 8) until at the aft or end of the after section the hull is substantially flat as seen at station 10.

In FIG. 9 there is shown a modified construction with a flat transom 12' and an after section having two V-shaped portions 20 and 21 (FIG. 10) of relatively sharp angle which gradually flatten out as seen at 22 and 23 (FIG. 11) to substantially a flat straight line at their after portions.

Figure 12:
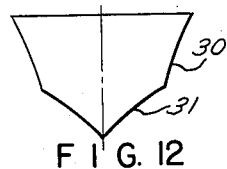
Figure 13:
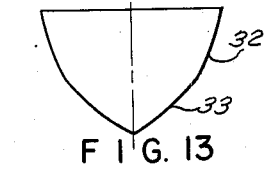
Figure 14:
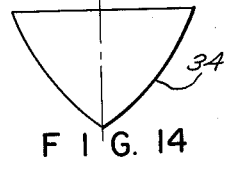
Figure 15:
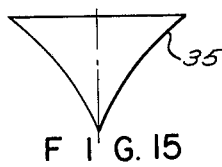
Figure 16:
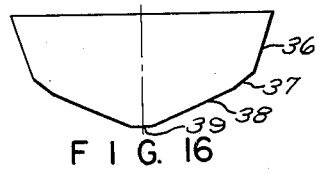
Figure 17:
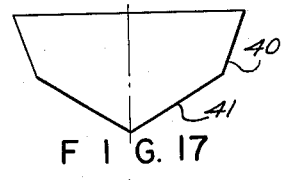

The particular shape of the forward section is not important so long as the forward section provides a flattened wake for the entry of the after section. Thus the forward section of FIG. 9 may have the contours of FIGS. 1, 2 and 3 or other forms such as illustrated in FIGS. 12 to 17 and 20 to 25 may be utilized. For example, FIG. 12 illustrates a hull having sides formed of two inwardly concave sections 30 and 31, whereas FIG. 13 shows these two sections as outwardly convex sections 32 and 33. In FIG. 14, the sides are of a single outwardly convex section 34, whereas in FIG. 15 the sides are of a single inwardly concave section 35. A hard chine hull also provides a proper entry section, and in FIG. 16 multiple section sides where each section is flat as at 36, 37, 38 and 39 are shown. FIG. 17 employs fewer sections of the same type of hull where there are two flat sections 40 and 41.

Figure 18:
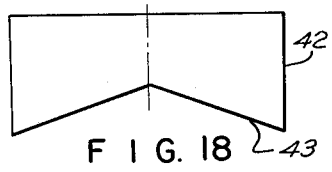
Figure 19:
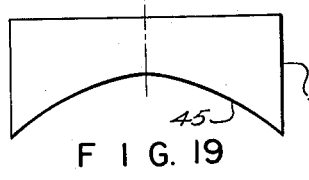
Figure 20:
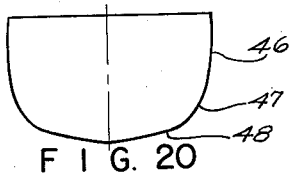
Figure 21:
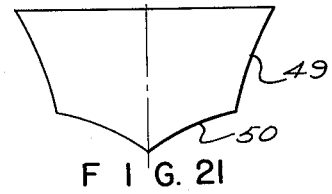
Figure 22:
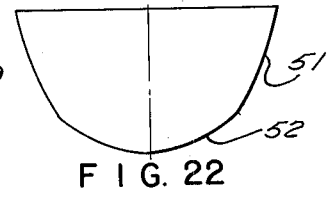
Figure 23:
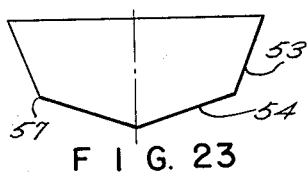
Figure 24:
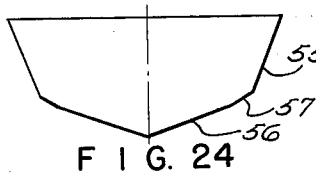
Figure 25:
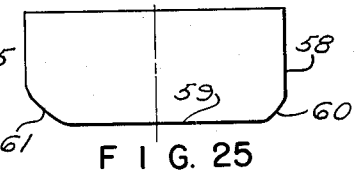
Figure 26:
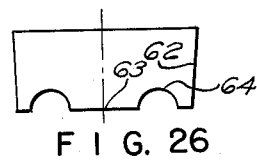
Figure 27:
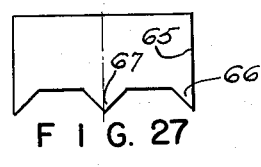
Figure 28:
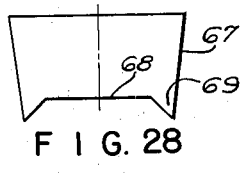
Figure 29:
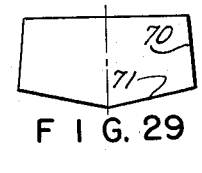
Figure 30:
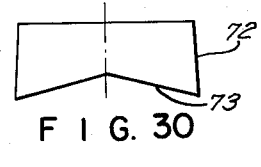

Modified forms of after section beyond the break 12 more generally take the shape such as shown in FIG. 18 where the sides are flat as at 42 and the bottom is an inverted V as at 43. In some cases, the bottom 44 as shown in FIG. 19 may be concave inwardly as there shown with a flat side 45. In FIG. 20 I have illustrated the side as convex outwardly as at 46 with a rounded bilge portion 47 thence extended in a straight line to the keel. A slightly different variation of inwardly concave sides 49 and 50 is shown in FIG. 21, while the use of outwardly convex sides 51 and 52 (FIG. 22) is equally adaptable. In FIGS. 23 and 24, a single chine form is suggested with sides 53, 55; bottoms 54, 56 and chine 57. In FIG. 25 a multiple chine is shown in two possible forms. Both cases use flat sides 58 with flat bottom 59 but the joining sections may be either a straight chine 60 or an arcuate chine 61. FIGS. 26, 27 and 28 show tunnel variations having straight sides 62, 65, 67 and bottom forms such as at 63 with arcuate recesses 64 at either side of the center or chine tunnels between sharp sections 66, 67 or still further a single tunnel between chines 69. In FIG. 29 the sides are tumbled home as at 70 being straight, and a flat shallow V bottom 71 is provided extending inwardly from these sides. In FIG. 30 the sides are straight and tumbled home as at 72 with an inverted V and straight bottom as at 73. From the above, it will accordingly be appreciated there is provided a great variety of possible shapes which may be utilized in connection with this invention.

In some cases it may be desirable to relate the forward section and aft section so that they may be hingedly connected by means of a hinge 75 shown in the profile view of FIG. 1. In this case both forward and aft sections are free to swing to release stresses between the sections due to uneven support of these sections in rough water, being connected only as at 75 through a hinge extending laterally. The weight of the two sections causes them to tend to maintain the position shown in FIG. 1.

In the pocket 76 just aft of the lateral transom 12, certain wave action may cause a suction to be created, and in order to relieve this suction a center tube or tubes 77 at either side of the center may project through the hull of the aft section close to the forward section so that air may be placed into this area to relieve any suction. Also a one-way or check valve 78 may be provided in each of these tubes 77 which will permit flow of air into the pockets 76, which air will be substantially held therein to provide a cushioning effect and create a better planing action of the hull.

The various lines designated as 80 in the bottom of the forward section and 81 in the forward part of the aft section indicate lines of flotation at various drafts parallel to the base line, it being understood that the innermost of these lines 83 in the after section would be the lines of flotation when the hull reaches its highest speed, whereas the intermediate lines would vary as to the plane of flotation whether the hull was quiet in the water or was attaining speeds up to its maximum speed which it may attain. The water line when quiet in the water would be at the location where the hull line in FIG. 1 intersects the 0 station.

I claim:

1. A high speed vessel planing type hull comprising a forward section and an after section, said forward section comprising a body having a vertical transom at its after end extending substantially the width of the vessel and a sharp V bottom at the bow at its entry into the water with said bottom merging into a flatter V as it progresses aft to said transom which has a generally flat V lower edge, said sharp V bottom at the bow having a major portion thereof above the at rest water line of the forward section, thus providing a portion of the sides of the vessel, whereby to provide a sharp entry into a wave and a relatively flattened wake intermediate the ends of the vessel and said after section having portions entering said flattened wake as the vessel moves forward.

2. A high speed vessel hull as in claim 1 wherein the forward section terminates between 10 percent and 40 percent of the vessel's length aft of the bow of the vessel to increase the longitudinal stability, thereby decreasing pounding and porpoising.

3. A high speed vessel hull as in claim 1 wherein the forward section terminates at about one third of the vessel's length aft of the bow of the vessel to increase the longitudinal stability, thereby decreasing pounding and porpoising.

4. A high speed vessel hull as in claim 1 wherein the after section has a body symmetrical with reference to a fore and aft center line divided to provide maximum displacement on either side of the center line.

5. A high speed vessel hull as in claim 1 wherein the after section has a body symmetrical with reference to a fore and aft center line and is shaped to provide planing at high speeds.

References Cited by the Examiner

UNITED STATES PATENTS

| | | | |
|---|---|---|---|
| 527,657 | 10/1894 | Brewer | 114—56 |
| 1,010,053 | 11/1911 | Hunter | 114—66.5 |
| 1,189,227 | 7/1916 | Baker | 114—66.5 |
| 1,831,339 | 11/1931 | Brush | 114—66.5 |
| 1,835,564 | 12/1931 | Grayson et al. | 114—66.5 |
| 2,397,683 | 4/1946 | Nelson | 114—66.5 |
| 2,991,745 | 7/1961 | Haar et al. | 114—66.5 |
| 3,113,543 | 12/1963 | Brownback | 114—66.5 |

MILTON BUCHLER, *Primary Examiner.*

FERGUS S. MIDDLETON, *Examiner.*